United States Patent
Guillon et al.

(10) Patent No.: US 11,953,381 B2
(45) Date of Patent: *Apr. 9, 2024

(54) WAVEFRONT SENSORS AND WAVEFRONT SHAPE DETERMINATION USING RELATED IMAGING SENSORS

(71) Applicants: UNIVERSITE DE PARIS, Paris (FR); SORBONNE UNIVERSITE, Paris (FR); ECOLE POLYTECHNIQUE, Palaiseau (FR); CENTRE NATIONAL DE LA RECHERCHE SCIENTIFIQUE, Paris (FR); COMMISSARIAT A L'ENERGIE ATOMIQUE ET AUX ENERGIES ALTERNATIVES, Paris (FR)

(72) Inventors: Marc Guillon, Versailles (FR); Pascal Berto, Paris (FR); Dimitris Papadopoulos, Antony (FR); Gilles Tessier, Paris (FR)

(73) Assignees: UNIVERSITE DE PARIS, Paris (FR); SORBONNE UNIVERSITE, Paris (FR); ECOLE POLYTECHNIQUE, Palaiseau (FR); CENTRE NATIONAL DE LA RECHERCHE SCIENTIFIQUE, Paris (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 200 days.

This patent is subject to a terminal disclaimer.

(21) Appl. No.: 17/442,976

(22) PCT Filed: Feb. 21, 2020

(86) PCT No.: PCT/EP2020/054695
§ 371 (c)(1),
(2) Date: Sep. 24, 2021

(87) PCT Pub. No.: WO2020/193032
PCT Pub. Date: Oct. 1, 2020

(65) Prior Publication Data
US 2022/0178760 A1    Jun. 9, 2022

(30) Foreign Application Priority Data
Mar. 26, 2019  (EP) .................................. 19305382

(51) Int. Cl.
*G01J 9/00*        (2006.01)

(52) U.S. Cl.
CPC ...................................... *G01J 9/00* (2013.01)

(58) Field of Classification Search
CPC ..... G01J 9/00; G02B 5/30; G06T 7/32; G06T 7/37
See application file for complete search history.

(56) References Cited

U.S. PATENT DOCUMENTS 5,448,053 A * 9/1995 Rhoads ..................... G01J 9/00
                                                          356/121
7,619,191 B1 * 11/2009 Zou .......................... G01J 9/00
                                                          359/849
(Continued)

FOREIGN PATENT DOCUMENTS

EP          3715805 A1    9/2020

OTHER PUBLICATIONS

Emmanuel J. Candes, "Compressive sampling", Proceedings of the International Congress of Mathematicians, Aug. 2006, vol. 3, pp. 1433-1452.
(Continued)

*Primary Examiner* — Jennifer D Bennett
(74) *Attorney, Agent, or Firm* — Shumaker, Loop & Kendrick, LLP

(57) ABSTRACT

A method for determining wavefront shapes of a multi-spectral signal light beam from a single signal image acqui-
(Continued)

sition of said multi-spectral signal beam, with a device including an optical assembly made at least of an optical mask and an imaging sensor, notably a matrix imaging sensor, for generating and recording intensity patterns of incident beams, by having these beams reflect on, or propagate through, the optical mask. The optical mask having the optical properties: i) to cause the intensity pattern to depend on the wavefront shape, so that a tilt applied to the wavefront shape results in a displacement amount of the intensity pattern, and ii) to produce uncorrelated intensity patterns over at least one surface area A of the imaging sensor, for a plurality of respective incident monochrome beams of different wavelengths having a same wavefront shape.

27 Claims, 6 Drawing Sheets

(56) References Cited

U.S. PATENT DOCUMENTS

| | | | |
|---|---|---|---|
| 11,609,124 B2* | 3/2023 | Guillon | G01J 9/00 |
| 2001/0043333 A1* | 11/2001 | Groot | G01B 9/02078 |
| | | | 356/511 |
| 2003/0081836 A1* | 5/2003 | Averbuch | G06T 7/12 |
| | | | 382/199 |
| 2019/0242780 A1* | 8/2019 | Rosen | G01N 21/958 |
| 2020/0209602 A1* | 7/2020 | Pau | G02B 21/18 |

OTHER PUBLICATIONS

International Search Report (ISR) for PCT/EP2020/054695 dated May 19, 2020 (2 pages).

Written Opinion for PCT/EP2020/054695 dated May 19, 2020 (8 pages).

Pascal Berto et al. "Wavefront-sensing with a thin diffuser", arxiv.org, Cornell University Library, 201 Olin Library Cornell University Ithaca, NY, 14853, Optics Letters, Oct. 10, 2017, XP081295668.

N.K. Metzger et al., "Harnessing speckle for a sub-femtometre resolved broadband wavemeter and laser stabilization", Nature Communications, vol. 8, Article No. 15610, Jun. 2017.

* cited by examiner

WAVEFRONT SENSORS AND WAVEFRONT SHAPE DETERMINATION USING RELATED IMAGING SENSORS

TECHNICAL FIELD

The present invention relates to an optical system for laser beam characterization, quantitative phase imaging and other applications.

BACKGROUND

Wavefront sensors, referred to as WFS in the following, are used to measure the wavefront of a light beam, defined as its curvature relative to a planar wavefront shape. They find applications in several domains ranging from laser beam metrology to quantitative phase imaging of biological objects and astronomy.

A WFS is typically composed of a phase or intensity mask placed before an intensity detector, a camera for example. The mask is used to create an intensity pattern on the camera. First, a reference beam is sent onto the WFS, with a planar wavefront or any other a priori known reference wavefront to measure a reference intensity pattern. Next, a signal beam is sent onto the WFS and generates a signal intensity pattern. The intensity pattern changes due to the wavefront change, even in the absence of intensity modulation, because of the mask that is placed before the intensity detector. In a typical WFS, the change in the intensity pattern corresponds to a complex geometrical distortion: Every point of the signal intensity pattern is translated when compared to the reference intensity pattern. If the reference intensity pattern is obtained using a planar wavefront, a translation vector map s is proportional to a transverse component of the local wave vector $\vec{k}_\perp$ of the impinging beam:

$$\frac{\vec{k}_\perp}{k_0} = \frac{\vec{s}}{d}$$

where $k_0$ is the wavenumber and d is the distance between the mask and the camera. The sought-for wavefront can typically be identified to be the optical path difference δ which can be computed thanks to an integration:

$$\nabla \delta = \frac{\vec{k}_\perp}{k_0}$$

The wavefront measurement is obtained thanks to a reconstruction algorithm that:
i) computes a translation map between the signal intensity pattern and the reference intensity pattern ii) integrates the translation map, applying the proper proportionality coefficient to get the wavefront change, and iii) adds the reference wavefront to the wavefront change.

Typical WFS use a monochrome intensity camera. Therefore, all current WFS can only measure a single intensity pattern, and thus a single wavefront per image acquisition. However, if the light beam is composed of several beams originating from different sources emitting at different wavelengths, each of which exhibiting a different wavefront, all these wavefronts cannot be reconstructed simultaneously. The reconstruction algorithm will converge towards a solution but this result is physically meaningless. Yet, in all aforementioned applications, light sources are spatially coherent but may have broad spectra and may travel across dispersive materials, for example atmosphere for astronomy, biological media, non-linear light-matter interactions in laser physics. In this case, although arising from a single point source, the outgoing wavefronts at every wavelength may differ. Ultra-short laser pulses as generated by the Apollon laser developed in Palaiseau (France) exhibit large spectral widths.

The current technical solution consists in recording as many sequential measurements as the number of distinct spectral channels, using a set of bandpass filters. This solution requires a stable-enough system all along the recording process, ~10 fs for pulsed lasers, ~1 ms for astronomy, ~10 ms in biology. However, high-power, ultra-short lasers usually have low repetition rates, as low as a few pulses per day.

Moreover, the current technical solution has several drawbacks: i) it is complicated, ii) it is expensive since it requires many filters with very sharp spectral properties, iii) it takes time as spectral measurements are made sequentially, and it is therefore not applicable to quickly evolving systems. Typically, for high energy lasers like Apollon working at low repetition rates, a single pulse measurement of all the wavefronts on the full spectral width would be desirable.

It is desirable to have a WFS that obviates all or part of the above-mentioned drawbacks and that makes it possible to determine the wavefront shapes of a multi-spectral signal light.

SUMMARY OF THE INVENTION

Method of the Invention

Exemplary embodiments of the invention aim to satisfy the need for a single-shot multispectral wavefront measurement and relate to a method for determining each wavefront shape of N spectral channels of a multi-spectral signal light beam from a single signal image I(x,y) acquisition of said multi-spectral signal light beam, with a device comprising an optical assembly made at least of an optical mask and an imaging sensor, notably a matrix imaging sensor, for generating and recording intensity patterns of incident beams, by having these beams reflect on, or propagate through, the optical mask, the optical mask having the optical properties:
i) to cause the intensity pattern to depend on the wavefront shape, so that a tilt applied to the wavefront shape results in a displacement amount of the intensity pattern,
ii) to produce uncorrelated intensity patterns over at least one surface area A of the imaging sensor, for a plurality of respective incident monochromatic beams of different wavelengths having a same wavefront shape, two uncorrelated random intensity patterns $S_1$ and $S_2$ being defined as statistically orthogonal relatively to a zero-mean cross-correlation product: $\langle (S_1 - \langle S_1 \rangle)^* (S_2 - \langle S_2 \rangle) \rangle$ where $\langle \cdot \rangle$ means statistical averaging or, equivalently under ergodic hypothesis, surface averaging.

the method comprising:
a) recording several reference intensity patterns $R_L(x,y)$ using the device, each reference intensity pattern $R_L(x, y)$ being generated by a respective reference incident monochromatic beam L with wavelengths $\lambda_L$, L varying from 1 to N, with N being the number of different reference incident monochromatic beams, x and y being coordinates;

Noteworthy, the reference intensity patterns $R_L(x,y)$ may be recorded with corresponding reference incident monochromatic beams having a same wavefront shape, or not. Furthermore, depending on the application, the wavefront shapes of the reference incident monochromatic beams must be known, or not. In its principle, a WFS can only measure a wavefront change.

If the experimentalist wants to measure the the wavefront shapes of the signal light beam, then the wavefront shape of the reference intensity patterns $R_L(x,y)$ must be known.

However, if imaging a biological sample for instance, the experimentalist may be only interested in the wavefront change associated with the sample. In this case the wavefront shapes associated with each reference intensity patterns $R_L(x,y)$ is not of interest and may be unknown to the experimentalist.

b) recording one single signal image $I(x,y)$ of the intensity pattern generated by the said multi-spectral signal light beam which comprises at least the N wavelengths, using the device, the single signal image $I(x,y)$ being representative of light impinging on the at least one surface area (A);

c) computing intensity-weight data $W_L^I(x,y)$ and deformation data $T_L^I(x,y)$, for all L varying from 1 to N, the intensity-weight data $W_L^I(x,y)$ and the deformation data $T_L^I(x,y)$ being representative of an intensity modulation and a diffeomorphism, respectively, of each given reference intensity pattern $R_L(x,y)$, at wavelength $\lambda_L$, all the N intensity-weight data $W_L^I(x,y)$ and the N deformation data $T_L^I(x,y)$ being computed, for L varying from 1 to N, so as to minimize, for the surface area A, from the single signal image $I(x,y)$:

a difference $D_A$ between the single signal image $I(x,y)$ on the one hand, and the sum of reference intensity patterns $R_L$ multiplied by intensity-weight data $W_L^I(x,y)$ and deformed by deformation data $T_L^I(x,y)$, on the other hand:

$$D_A = \left\| I(x,y) - \sum_{L=1}^{N} W_L^I(x,y) R_L[(x,y) + T_L^I(x,y)] \right\|_A$$

the symbol $\|\cdot\|_A$ designating a norm calculated for all $(x,y)$ sampling points in the surface area A;

$W_L^I(x,y)$ represents the deformed intensity-weight data;

for the surface A, each given reference intensity patterns $R_L(x,y)$ being orthogonal to each reference intensity pattern $R_K(x,y)$ relatively to the zero-mean cross-correlation product, when K entire natural different from L and chosen between [1; N];

Alternatively, it is possible to compute intensity-weight data $W_L^T(x,y)$ aiming at minimizing $D_A$ which may then also be expressed in a more comprehensive manner as:

$$D_A = \left\| I(x,y) - \sum_{L=1}^{N} W_L^T[(x,y) + T_L^I(x,y)] R_L[(x,y) + T_L^I(x,y)] \right\|_A$$

In this case the computation of $W_L^T(x,y)$ is equivalent to the computation of $W_L^I(x,y)$, the two being related by $W_L^T(x,y) = W_L^I[(x,y) - T_L^I(x,y)]$, provided that the minimization also allows the determination of deformation data $T_L^I(x,y)$.

$W_L^T(x,y)$ represents the non-deformed intensity-weight data;

d) generating data for each wavelength $\lambda_L$ representative of:

the shape of the wavefront by integrating the deformation data $T_L^I(x,y)$, the intensity map based on the weight $W_L^I(x,y)$.

The invention enables to simultaneously measure wavefront shapes at different wavelengths using a single image acquisition from a same multi-spectral light beam. This aspect is advantageous for a variety of applications such as optical metrology, laser metrology, quantitative phase microscopy (Biology, chemistry . . . ), adaptive optics, ophthalmology and optical thermometry.

In fact, laser metrology requires especially accurate measurement of the wavefronts and even of the wavefront all along the beam spectrum. For ultra-short pulses, the complete reconstruction of the electric field in both space and time could be achieved thanks to the multi-spectral wavefront measurement. Ideally, the spatio-temporal profile of the laser pulse should be determined at several places all along the optical beam path to prevent the use of too cumbering or too complicated systems. The simplicity of the method according to the present invention matches this requirement.

For microscopy application, the measurement of the multi-spectral wavefront may in addition allow to characterize the dispersion by the material and thus provide information about the chemical composition of the medium.

The method according to the invention may present several advantages compared to known methods in the related art: i) it is easy to implement and it may yield a more compact measurement system, ii) it performs spectral measurements simultaneously, which facilitate its application to quickly evolving systems, iii) it reduces the cost associated to the measurements by avoiding the use of many filters.

Still further, the proposed method makes it possible to acquire an optimized number of modes, spatial and/or spectral, and allows the user to choose a compromise between spatial and spectral resolution, notably by varying the distance between the optical mask and the imaging sensor.

The term "signal intensity pattern" refers to a distribution of signal intensity wherein different regions of the pattern have different amounts or degrees of signal intensity. The signal intensity pattern may be a speckle pattern, characterized by a randomly distributed point-like intensity structures.

The term "diffuser" should be understood as any element that scatters light, that is to say any material that is able to diffuse specular light, ie light with a primary direction, to a diffuse light, i.e. light with random or pseudo-random light direction and phase delays. For instance, a diffuser can be an engineered pseudo-diffuser made of a metasurface. An optical fiber bundle can also be considered as a diffuser.

The term "memory effect" is a property of an optical mask predicting that a tilt in the wavefront results in a translation of the intensity pattern at a distance behind the optical mask.

By "uncorrelated intensity patterns", it should be understood that, given a measure of similarity, the intensity patterns are not related to each other. For example, the position of maxima intensity in a pattern is not related to the position of maxima spot in the other. An additional example is encountered when the cross-correlation product is used as a measure of similarity. In this case the statistical average of the zero-mean cross-correlation product between two uncorrelated signal intensity patterns is uniformly zero. The zero-mean cross correlation product between two signals $S_1$ and $S_2$ is defined as $\langle (S_1 - \langle S_1 \rangle)*(S_2 - \langle S_2 \rangle) \rangle_A$, where $\langle \cdot \rangle_A$ stands for surface averaging over a surface area A. Uncorrelated intensity patterns relatively to the zero-mean cross correlation product is of specific interest because it provides a simple mathematical mean to estimate the deformation data $T_L'(x,y)$, the intensity weight data $W_L'(x,y)$ and thus of the minimum of $D_A$. If reference intensity patterns $R_L(x,y)$ are exactly orthogonal to one another for all $L \in [1,N]$ relatively to the cross-correlation product, and if $T_L'(x,y)$ and $W_L'(x,y)$ are constant over the surface area A, then $T_L'(x,y)$, and $T_L'(x,y)$ can be directly obtained from the N cross-correlation images $C_A(I,R_L) = (I - \langle I \rangle) * (R_L - \langle R_L \rangle_A)$. Each of the N cross-correlation image exhibits a peak: the intensity-weight data $W_L'(x,y)$ is the amplitude of this peak and the deformation data $T_L'(x,y)$ is the displacement vector between the said peak or its centroid, from the center of the zero-mean cross-correlation product image $C_A(I,R_L)$.

The Optical Mask

Preferably, the optical mask is a diffuser (or an engineered pseudo-diffuser). The latter may have a memory effect angle ranging from 0° to 45°. Comparatively to microlens arrays and gratings usually used in methods in the related art, diffusers have the advantage to be of relatively low-cost.

The optical mask, notably a diffuser, may have a thickness lower than 10 microns. A thin diffuser may ensure a large memory effect.

The optical mask may have a scattering or diffracting angle of $\theta = \lambda/p_x$ or smaller where A is a central wavelength and $p_x$ the pixel size of the imaging sensor.

The optical mask, notably a diffuser, may be a transmission optical mask or a reflective optical mask.

An optical mask working in transmission, notably a diffuser, may comprise, for example, etched glass or silica substrate, ground glass, opal glass, sandblasted glass or plastic, etched glass or plastic, molded materials produced by a randomly textured mold, nano or micro-particles as in paints, deposited on a transparent substrate.

Preferably, the transmissive optical mask includes a patterned surface such as a computer-designed wrinkled surface.

A reflective optical mask, notably a diffuser, may include a rough surface such as sandblasted metal, plastic or ceramic, or etched metal, plastic, or ceramic, or molded materials produced by a rough mold, or paint deposited on a substrate, or combinations thereof.

The Imaging Sensor

The imaging sensor may be a monochromatic sensor.

The imaging sensor may be a matrix imaging sensor.

The imaging sensor may be, for example, a CCD, CID or CMOS imaging sensor.

The imaging sensor may be based on a single pixel detector coupled to a spatial light modulator like a digital micro-mirrors device.

The intensity pattern image may be produced by one matrix imaging sensor or several matrix imaging sensors.

The optical mask may be placed at a distance d from the imaging sensor ranging from 0 to up to more than $$10 \frac{L}{\theta},$$

where L is the size of the imaging sensor and θ the scattering angle of the optical mask.

The at least one surface A may cover at least 4 pixels of the imaging sensor surface, preferably ranging from 4 pixels to 100% of the imaging sensor surface.

According to an embodiment of the present invention, an intermediate optical system is placed between the optical mask and the imaging sensor, the said optical system imaging the diffuser at a distance d from the imaging sensor. The advantage of this optical system being to allow a fine tuning of both the magnification and the distance between the image of the optical mask and the imaging sensor plane.

The intermediate optical system may comprise at least one lens. For example, the intermediate optical system may consist of a Galileo telescope.

The Light Beam

The light beam may have any spectral width in any spectral range, notably within the visible or the infra-red range.

The light beam may be generated by a broadband laser system, notably an ultrashort laser system and potentially a chirped pulse amplifier laser system.

An interferometer may be added before the optical system in order to discretize the spectrum of the broadband multispectral signal light beam, the said multispectral signal light beam potentially exhibiting a continuous spectrum.

The spectral phase of the light beam may be known at least on a fraction of the surface area A of the imaging sensor, the method may comprise computing the spectral phase for at least one surface fraction of the imaging surface other than the said fraction of the surface area A, in particular on all the surface area A, the method possibly comprising the computation of a temporal profile of the multispectral signal light beam on the surface area via a transform from the spectral to the time domain, and vice-versa, such as achieved by a Fourier transform.

The Reference Monochromatic Beams

The reference monochromatic beams L may arise from the output of an optical system having a reference configuration and the said reference incident monochromatic beams L may have distinct wavefront shapes.

In some embodiments, the reference incident monochromatic beams have a same known wavefront shape which may be planar or spherical, for instance.

Reference monochromatic beams may have wavelength differences ranging from 1 femtometer to 1 micrometer.

The number of reference intensity patterns for which the spatial correlation data are computed may be larger than 2.

Sub-Images

According to some embodiments, signal sub-images or macropixels, each representative of light impinging on a portion A' of the at least one surface area A, are extracted from the single signal image I(x,y). The advantage of extracting sub-images may be to simplify the computation of data by involving smaller images and simpler weight and deformation data.

The signal sub-image may cover at least 4 pixels of the one signal image, up to 100% of the intensity pattern image I(x,y).

The signal sub-image may be a macro-pixel whose size is larger than or equal to 2 pixels of the imaging sensor, preferentially larger than N pixels (with N the number of spectral channels), in which case deformation data $T_L'(x,y)$ and intensity weight data $W_L'(x,y)$ may be assumed to be constant over the macro-pixel surface area.

In the case the optical mask is a diffuser having a scattering or diffracting angle of θ, resolving N spectral channels preferably requires extracting sub-images of surface area A ranging from $$A = \frac{1}{10} N \left(\frac{\lambda}{\theta}\right)^2 \text{ to } A = 10 N \left(\frac{\lambda}{\theta}\right)^2,$$

where λ is a central wavelength, an average wavelength or a median wavelength of the multi-spectral signal light beam.

Wavefront Determination Method

Calculation of deformation data $T_L'(x,y)$ and intensity-weight data $W_L'(x,y)$ results from the minimization of $D_A$ defined as:

$$D_A = \left\| I(x, y) - \sum_{L=1}^{N} W_L^I(x, y) R_L[(x, y) + T_L^I(x, y)] \right\|_A$$

where $\|\cdot\|_A$ is a norm, typically the quadratic norm. $\|\cdot\|_A$ can also be a so-called $L_1$ norm or any other norm defined mathematically.

The formula $R_L[(x,y)+T_L'(x,y)]$ can be simplified, somewhat imprecisely, to become $R_L[T_L'(x,y)]$, as previously described in the patent application EP19305382.

In the European application EP19305382, the term $T_L'(x,y)$ corresponds to the global deformation of point (x,y) and refers simultaneously to the point (x,y) and to the deformation of said point.

In the present application, the difference $D_A$ is reformulated to explicitely describe what is determined by the calculation.

Several numerical techniques are possible to compute such a norm minimization.

(1) For instance, intensity-weight data $W_L'(x,y)$ and deformation data $T_L'(x,y)$ may be computed thanks to deep learning approaches using neuronal networks. Convolutional neuronal networks are typically suited to achieve such image processing. In deep learning approaches, the algorithm leading to minimizing $D_A$ must be trained thanks to a collection of signal images, references images with respective N wavefronts known.

(2) Alternatively, intensity-weight data $W_L'(x,y)$ and deformation data $T_L'(x,y)$ may be computed thanks to a genetic algorithm. In this approach, a large number of collection of would-be solutions are randomly tested, evaluated, selected according to the value of $D_A$ and best solutions are crossed to one another to generate more optimal solutions. The algorithm terminates when reaching a satisfactory enough solution minimizing $D_A$.

(3) Alternatively, deformation data $T_L'(x,y)$ and intensity-weight data $W_L'(x,y)$ can be estimated by splitting the surface area A into several smaller sub-images defining macro-pixels of surface area A'.

$T_L'(x',y')$ and $W_L'(x',y')$ are then estimated for each macro-pixel of surface area A' and for every wavelength XL by:

i) Assuming that $W_L'(x',y')=W'_L$ and $T_L'(x',y')=T'_L$ where $W'_L$ is a constant and positive scalar and $T'_L$ a constant two-dimensional translation vector, over the surface area A', with (x',y') coordinates on A'.

ii) computing the intensity-weight data $W'_L$ and the deformation data $T'_L$, between the signal sub-image I(x,y) and each of the reference intensity patterns $R_L(x,y)$ so as to minimize, for the corresponding surface area A', the difference $D_{A'}$;

$$D_{A'} = \left\| I(x, y) - \sum_{L=1}^{N} W'_L R_L[(x, y) + T'_L] \right\|_{A'}$$

Then in a step iii) updating the deformation data $T_L'(x,y)$ and the intensity data $W_L'(x,y)$ for all coordinates (x,y) on the surface A by applying the equality $T_L'(x,y)=T_L'(x',y')=T'_L$ and $W_L'(x,y)=W_L'(x',y')=W'_L$ with x=x',y=y'.

In other words, wherein the imaging sensor is a matrix imaging sensor, the method of the invention presents in the step c, where the surface A=ΣAi, with Ai being the surface of a micropixel:

computing intensity-weight data $W_L'(Ai)$ and deformation data $T_L'(Ai)$ which are constant for the macropixel of surface Ai, for all L varying from 1 to N, by minimizing the difference DAi updating the intensity-weight data $W_L'(x,y)$ and the deformation data $T_L'(x,y)$ for all coordinates (x,y) on the surface A, with $W_L'(x,y)=W_L'(Ai)$ and $T_L'(x,y)=T_L'(Ai)$ for all (x,y) belongs to Ai Relying on sub-images enables to work at a local scale. At a local scale the signal intensity pattern may be a linear combination of simply translated reference intensity patterns $R_L(x,y)$ and pattern deformations may be neglected, making algorithms simpler. In this case, the local translation of the signal intensity pattern is proportional to the local tilt of the wavefront. The size of the sub-images depends on geometrical and physical parameters of the WFS.

The intensity-weight data $W_L'(x,y)$ and the deformation data $T_L'(x,y)$, notably in the case when the signal sub-images are linear combinations of locally translated reference intensity patterns $R_L(x,y)$, may be estimated by several simple computational means. Notably, they can be obtained by:

a) computing cross-correlation product images, for each signal sub-image, between the signal sub-image and each of the reference intensity patterns $R_L(x,y)$, the plurality of reference incident monochromatic beams L being uncorrelated relatively to the cross-correlation product, the cross-correlation product image between the signal sub-image and each of the intensity patterns $R_L(x,y)$ having a peak, the intensity-weight data being the amplitude of the peak and the deformation data $T_L'(x,y)$ being the translation vector between the said peak or its centroid from the center of the cross-correlation product image.

(4) The deformation data $T_L'(x,y)$ and intensity-weight data $W_L'(x,y)$ can be estimated by computing a Wiener deconvolution of the signal sub-images by the reference intensity patterns $R_L(x,y)$, or a Wiener deconvolution of the intensity patterns $R_L(x,y)$ by the signal sub-images. These Wiener deconvolution having a peak, the intensity-weight data $W_L'(A)$ being the amplitude of the peak and the deformation data $T_L'(A)$ being the displacement vector between the said peak or its centroid, from the center of the zero-mean cross-correlation product image.

(5) The deformation data $T_L'(x,y)$ and intensity-weight data $W_L'(x,y)$ can be estimated by computing a matrix inversion algorithm, where the matrices to be inverted being related to at least a transform of a sub-image of a reference intensity pattern $R_L(x,y)$, such as a Fourier transform. Matrix inversion can involve for instance Moore-Penrose pseudo-inversion, singular value decomposition, Tikhonov regularization, etc.

In the case when the signal sub-images are linear combinations of locally translated reference intensity patterns $R_L(x,y)$ or conversely, when local deformation of the reference intensity patterns cannot be neglected over the sub-images area A', the intensity-weight data $W_L'(x,y)$ and deformation data $T_L'(x,y)$ may be computed thanks to more elaborated algorithms, notably:

5a) for every sub-images A', an iterative optimization algorithm aiming at minimizing a mean-squared-difference between the experimental signal intensity pattern and the signal intensity pattern retrieved from reference intensity pattern deformation. This minimization can be carried out numerically relying for instance on genetic type algorithms, or steepest descent algorithm.

5b) Intensity-weight data $W_L'(x,y)$ and deformation data $T_L'(x,y)$ may be computed thanks to a compressed sensing algorithm. A description of compressed sensing theory can be found, for instance, in Candés, E. J. (2006, August), *Compressive sampling*, In Proceedings of the international congress of mathematicians (Vol. 3, pp. 1433-1452) and in references cited therein.

Such compressed sensing algorithm enables to simultaneously minimize two quantities, one of which being the root mean squared error between the experimental data (the signal intensity beam) and the rebuilt data. The other quantity to be minimized here is the number of non-zero coefficients in each translation image.

6) Other minimization reconstruction algorithms may also be used.

Other Technical Features

Generating wavefront data comprises integrating displacement data $T_L'(x,y)$ over at least one direction of the at least one image and may comprise adding the known reference wavefront shapes, which may be simply planar or spherical.

In some embodiments, the reference wavefront shapes are not known but may arise from the system in a reference configuration. The single signal intensity beam must then be recorded after a slight modification of the system, for instance, the introduction of an optically thin sample in the optical path of the optical light beam. In this case, the wavefronts obtained by integrating displacement data $T_L'(x,y)$ are then directly the measure of the wavefront deformation introduced by the sample.

Measured wavefront shapes may be characteristic of some chromatic aberrations introduced by an optical system.

Device of the Invention

The invention also relates to a wavefront sensor for a multi-spectral signal light beam from a single image acquisition of the said multi-spectral signal light beam, comprising an optical assembly made at least of:

an optical mask and an imaging sensor for generating and recording intensity patterns of incident beams, by having these beams reflect on, or propagate through, the optical mask, the optical mask having the optical properties:
i) to cause the intensity pattern to depend on the wavefront shape, so that a tilt applied to the wavefront shape results in a displacement amount of the said intensity pattern.
ii) to produce uncorrelated intensity patterns over at least one surface area A of the imaging sensor, for a plurality of respective incident monochromatic beams of different wavelength having a same wavefront shape, the imaging sensor recording:
a) several reference intensity patterns $R_L(x,y)$, each reference intensity pattern $R_L(x,y)$ being generated by having a respective reference incident monochromatic beam L with wavelengths $\lambda_L$, reflect on or propagate through the optical mask L varying from 1 to N, with N being the number of different reference incident monochromatic beams, x and y being coordinates;
b) one single signal image $I(x,y)$ of the intensity pattern generated by having the multi-spectral signal light beam which comprises at least the N wavelengths reflect on or propagate through the optical mask, the single signal image $I(x,y)$ being representative of light impinging on the at least one surface area (A);

computing means for:
c) computing intensity-weight data $W_L'(x,y)$ and deformation data $T_L'(x,y)$, the intensity-weight data $W_L'(x,y)$ and the deformation data $T_L'(x,y)$ being representative of an intensity modulation and a diffeomorphism, respectively, of each reference intensity pattern at wavelength $\lambda_L$, the intensity-weight data $W_L'(x,y)$ and the deformation data $T_L'(x,y)$ being computed so that to minimize, for the at least one surface area A, a quantity that depends on the differences $D_A$ between the single signal image $I(x,y)$ on the one hand, and the sum of reference intensity patterns $R_L(x,y)$ multiplied by intensity-weight data $W_L'(x,y)$ and deformed by deformation data $T_L'(x,y)$, on the other hand:

$$D_A = \left\| I(x,y) - \sum_L W_L^I(x,y) R_L[(x,y) + T_L^I(x,y)] \right\|_A$$

the symbol $\|\cdot\|_A$ designating a norm calculated for all $(x,y)$ sampling points in the surface area A;
d) generating data for each wavelength representative of:
the shape of the wavefront by integrating the deformation data $T_L'(x,y)$,
the intensity map based on the weight $W_L'(x,y)$.

The optical mask may be a diffuser, an engineered pseudo-diffuser, a metasurface, a freeform optic or an optical fiber bundle.

The computing means may be configured for:
extracting signal sub-images, each representative of light impinging on a portion A' of the at least one surface area, from the single signal image $I(x,y)$;
estimating deformation data $T_L'(x,y)$ for each sub-image and for every wavelength XL by:
i) computing the intensity-weight data $W_L'(x,y)$ and the deformation data $T_L'(x,y)$ between the signal sub-image and each of the reference intensity patterns $R_L(x,y)$ so as to minimize, for the corresponding surface area A', a quantity that depends on the differences $D_A'$;
ii) updating the deformation data $T_L'(x,y)$ by storing the deformation data $T_L'(x,y)$ at at least one point $(x,y)$ inside said surface area A'.

The computing means may be configured to estimate the deformation data $T_L'(x,y)$ by computing zero-mean cross-correlation product images, for each signal sub-image, between the signal sub-image and each of the reference intensity patterns $R_L(x,y)$, the plurality of reference incident monochromatic beams L being uncorrelated relatively to the zero-mean cross-correlation product, the zero-mean cross-correlation product image between the signal sub-image and each of the reference intensity patterns $R_L(x,y)$ having a peak and the displacement amount being the distance between the said peak, or its centroid, from the center of the zero-mean cross-correlation product image.

The computing means may be configured to compute the intensity-weight data $W_L'(x,y)$ and the deformation data $T_L^I(x,y)$ thanks to: —a Wiener deconvolution of the signal sub-images by the reference intensity patterns $R_L(x,y)$, or—a Wiener deconvolution of the reference intensity patterns $R_L(x,y)$ by the signal sub-images.

According to a further aspect of the invention, an optical device is provided, comprising: a wavefront sensor according to the invention as defined above; and a light emitting source for generating a multi-spectral light beam with specific wavelengths which is a broadband laser system, notably a chirped pulse amplifier laser system.

The optical mask may be a diffuser, an engineered pseudo-diffuser, a metasurface, a freeform optic or an optical fiber bundle.

Exemplary embodiments of the present invention also relate to the use of a multi-spectral wavefront sensor for a multi-spectral signal light beam according to the invention, in: optical metrology, laser metrology, quantitative phase microscopy (Biology, chemistry . . . ), adaptive optics, ophthalmology and optical thermometry.

It is to be understood that both the general description above and the detailed description below are exemplary only and are not restrictive of the scope of the invention.

BRIEF DESCRIPTION OF THE DRAWINGS

The accompanying drawings, which are incorporated in and constitute a part of the specification, illustrate presently preferred embodiments of the invention, and together with the description, serve to explain the principles of the invention. In the drawings.

DETAILED DESCRIPTION

Whenever possible, the same reference numbers will be used throughout the drawings to refer to the same or like parts.

Figure 1A:
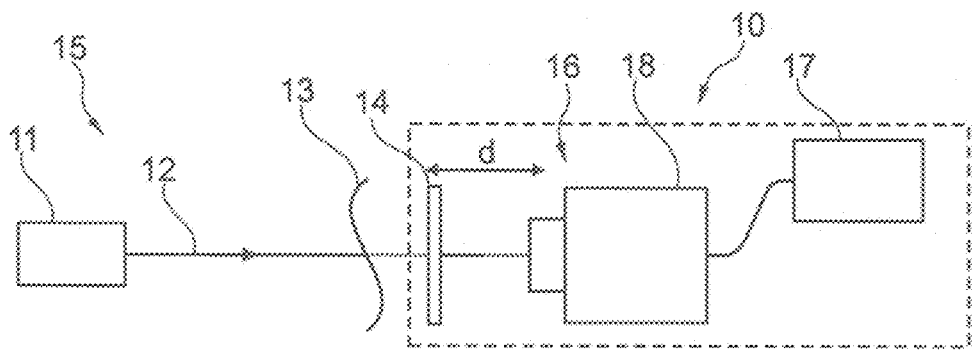
FIG. 1a is a schematic illustration of an embodiment of an optical system according to the invention.
Figure 1C:
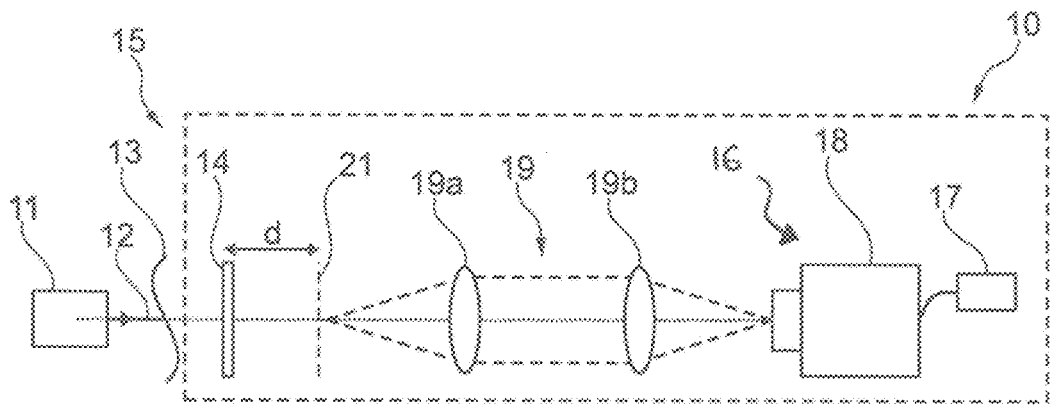
FIG. 1c is a schematic illustration of an embodiment of an optical system according to the invention.
Figure 1B:
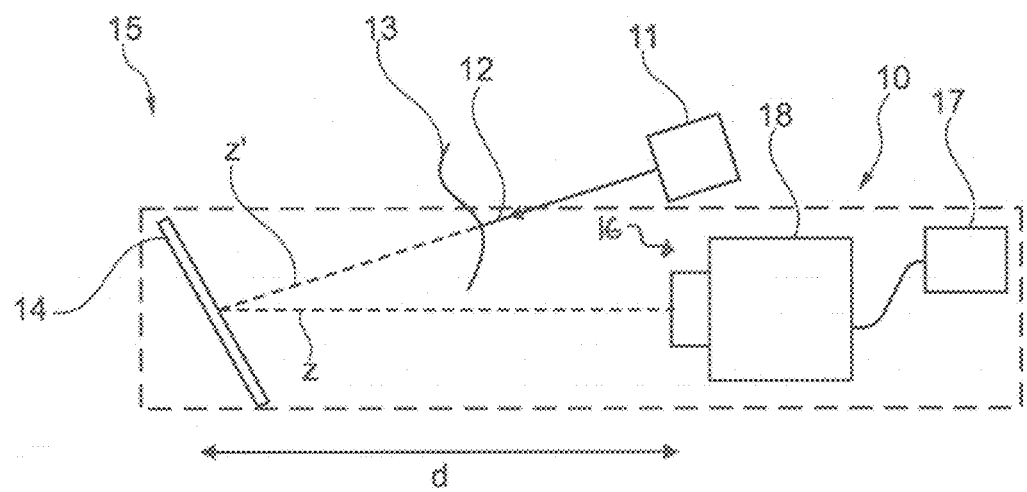
FIG. 1b is a schematic illustration of an embodiment of an optical system according to the invention.

In accordance with the invention, and as broadly embodied, in FIGS. 1a, 1b and 1c, an optical device 15 is provided.

The optical device 15 comprises a light source 11 for generating a multi-spectral signal light beam 12. Said multi-spectral signal light beam may potentially exhibits a continuous spectrum.

The optical device 15 further comprises a wavefront sensor 10. The latter includes device 16 comprising an optical mask 14 and an imaging sensor 18 for generating and recording intensity patterns of incident beams. For calculation purpose, computing means are also provided. The computing means may comprise a memory storing, a set of instructions and processor for executing said set of instructions, such as a PC computer or dedicated microcontroller bound. For purposes of illustration, the computing means are shown as block 17, which may be part of the wavefront sensor 10 or separate from the latter.

As shown in FIGS. 1a, 1b, 1c and 1d, the optical mask 14 is illuminated by the light beam 12 presenting a wavefront 13 and originated from a light source 11. Depending on the application of the optical device 10, the source of light 12 may be a broadband laser system, notably a chirped pulse amplifier laser system. In some embodiments, an interferometer may be added on the path of the beam 12, between the light source 11 and the wavefront sensor 10, in order to discretize the spectrum of the multispectral light beam 12.

FIG. 1a displays an embodiment of the wavefront sensor 10 where the optical mask is working in transmission preferably at the close vicinity of the imaging sensor 18, for example at a distance d, ranging from 0 to 10 L/θ, where L is the size of the imaging sensor and θ the scattering angle of the optical mask. In the illustrated example, the axis of incidence of the light beam is perpendicular to the optical mask. In a variant, the axis of incidence of the light beam forms an angle smaller than 90° with the optical mask.

Figure 2:
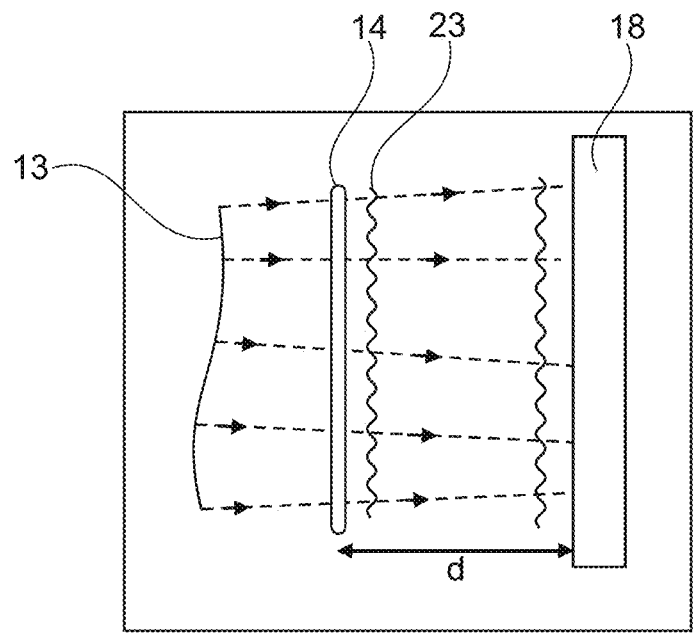
FIG. 2 is a schematic illustration of optical mask properties according to the invention.

When the incident light beam 12 with input wavefront 13 passes through the optical mask, the latter is scattered. Optical mask crossing causes the intensity pattern to depend on the wavefront shape, so that a tilt applied to the wavefront shape results in a displacement amount of the said intensity pattern, as can be seen in FIG. 2. Such property is also commonly referred to as the "memory effect" of the optical mask. This assumption may be valid until a so-called memory effect angle. The latter may range from 0° to 45°.

Figure 1D:
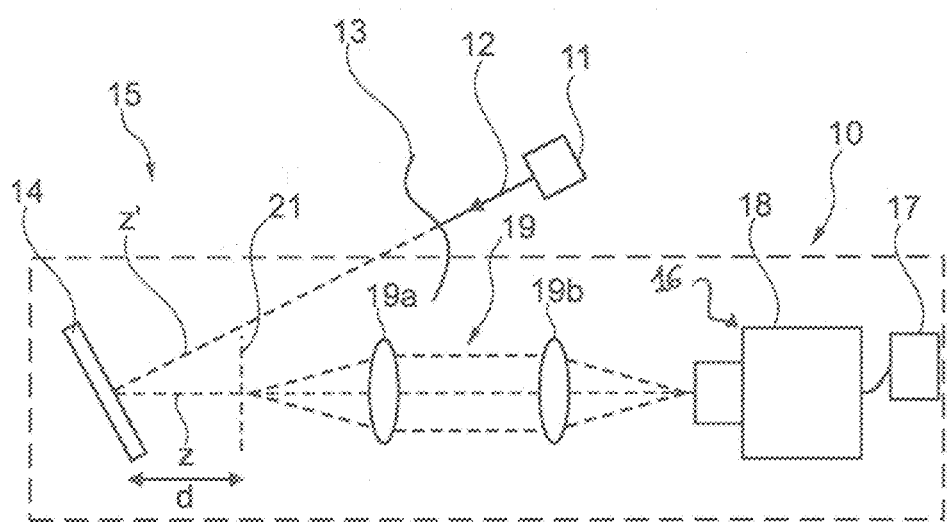
FIG. 1d is a schematic illustration of an embodiment of an optical system according to the invention.

FIGS. 1b and 1d show an alternative embodiment where the optical mask 14 is working in reflection, preferably at a close vicinity of the imaging sensor. In this case the light beam 12 is incident along the parallel direction to an axis of incidence Z' of the reflective optical mask 14, and is deviated towards the imaging sensor along an axis Z.

Figure 3:
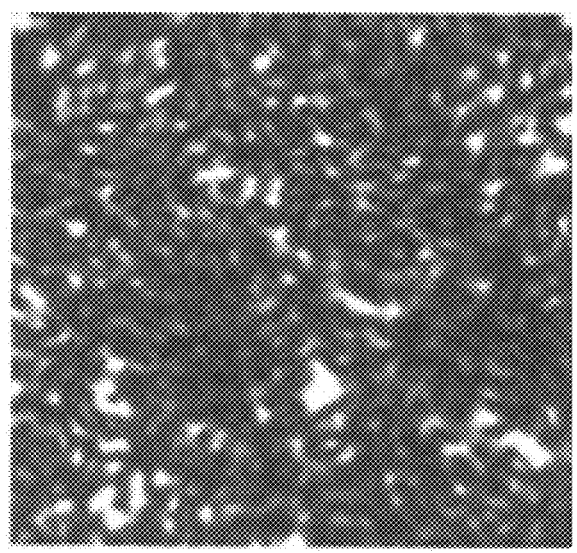
FIG. 3 is a schematic illustration of optical mask properties according to the invention.

The light beam 22 emerging from the optical mask 14 is then captured using the imaging sensor 18, yielding an intensity pattern image I(x,y). The intensity pattern of emerged light beam 22 is a superposition of individual intensity patterns weighted by their respective contributions to the signal beams constituting light beam 12. An example of a signal intensity pattern generated with the optical mask 14 is shown in FIG. 3. In FIG. 3, the signal intensity pattern corresponds to a speckle pattern generated by a diffuser.

The imaging sensor 18 may be a monochromatic sensor.

In a preferred embodiment, the imaging sensor 18 is a matrix imaging sensor.

The imaging sensor 18 may be, for example, a CCD, a CID or a CMOS imaging sensor.

The wavefront sensor 10 may include more than one imaging sensor. In a such case, the intensity pattern image may be produced by a single imaging sensor or several imaging sensors.

Referring to FIGS. 1c and 1d, other embodiments of a wavefront sensor 10 are shown. In these embodiments, an intermediate optical system 19 is placed between the optical mask 14 and the imaging sensor 18. The optical mask 12 is placed at a distance d from the conjugate plan 21 defined by the intermediate optical system.

The intermediate optical system 19 may comprise at least one lens. For example, as illustrated in FIGS. 1c and 1d, the intermediate optical system consists of a a set of relay lenses 19a; 19b.

The device 16 comprises the optical mask 14, the imaging sensor 18 and the intermediate optical system 19 in FIGS. 1c and 1 d.

Preferably, the optical mask 14 is a diffuser or an engineered diffuser. An example of a suitable diffuser is described in the article (Berto, P., Rigneault, H., & Guillon, M. (2017). *Wavefront sensing with a thin diffuser*. Optics letters, 42(24), 5117-5120).

Otherwise, the optical mask 14 may be any optical mask:
i) causing the intensity pattern to depend on the wavefront shape as mentioned above, and producing uncorrelated intensity patterns over at least one surface area A of the imaging sensor, for a plurality of respective incident monochromatic beams of different wavelength having a same wavefront shape. The property ii) is evaluated relatively to a given measure of similarity.

The optical mask 14 can be:
a ground glass or holographic diffuser
a engineered pseudo-diffuser, the said engineered pseudo-diffuser having the property to produce intensity patterns that are exactly orthogonal relatively to the zero-mean cross-correlation product over at least one surface area A, for a plurality of respective incident monochromatic beams of different wavelengths having a same wavefront shape;
a diffractive optical element;
a dispersive optical fiber bundle, a metasurface, or a freeform optical element.

A measure of similarity between two intensity patterns can be mathematically characterized using correlation tools. For example, a measure may consist in localizing critical points of the intensity such as intensity maxima and to look for correlations between intensity maxima localization of the two intensity patterns. This can be quantified using a Pearson correlation coefficient. It can also be quantified using the mean average distance to the nearest neighbor weighted by the critical point density.

Figure 4:
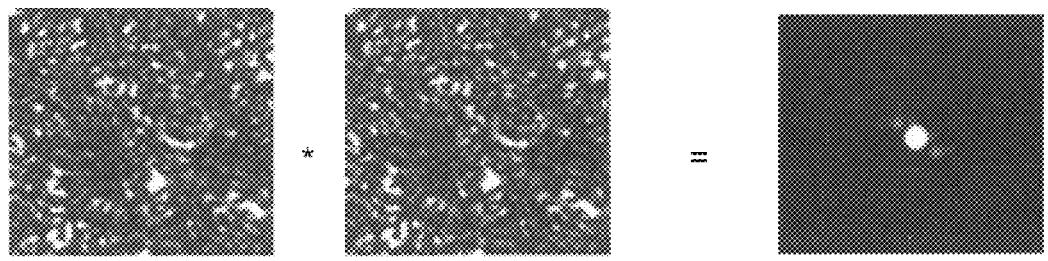
FIG. 4 is a schematic illustration of optical mask properties according to the invention.

A measure of similarity between two intensity patterns may also be estimated by computing a zero-mean cross-correlation product. A statistical average of the zero-mean cross-correlation product between two uncorrelated random signals is zero. In contrast, a statistical average of the zero-mean cross-correlation product of an intensity pattern with itself is a function admitting an extremum, in particular a maximum. An illustration of the zero-mean cross-correlation product of the speckle of FIG. 3 with itself (also called auto-correlation product) is shown in FIG. 4. The result displayed in FIG. 4 exhibits an intense central bright spot demonstrating the high degree of correlation of an intensity pattern with itself.

Alternatively, a Wiener deconvolution can be used rather than a zero-mean cross-correlation product. The result of a Wiener deconvolution applied to an intensity pattern with itself is similar to what is displayed in FIG. 4.

Figure 5:
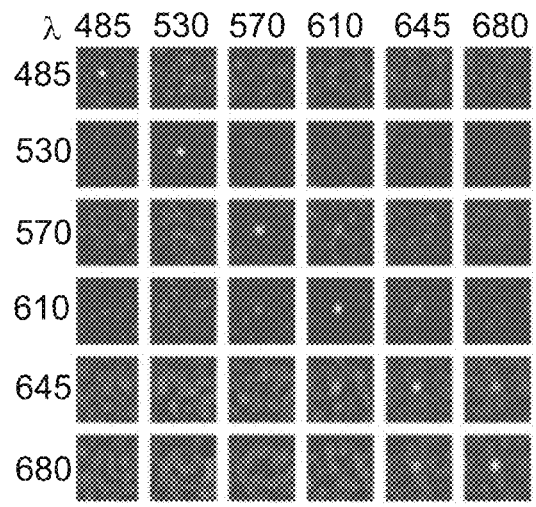
FIG. 5 is a schematic illustration of optical mask properties according to the invention.

An example illustrating property ii) is shown in FIG. 5.

FIG. 5 shows an illustration of correlation images computed between reference intensity patterns $R_L(x,y)$ obtained with the optical mask 14 at different wavelengths, ranging from 485 nm to 680 nm. Here, by way of illustration, the correlation is evaluated for a signal sub-image extracted from each intensity pattern $R_L(x,y)$. Each sub-image is a macro-pixel whose size is 32×32 pixels. Here, Wiener deconvolution is used as the correlation tool.

FIG. 5 shows a 6×6 matrix of images. Each image at position (i,j) represents the Wiener deconvolution between the sub-images at wavelength $\lambda_i$ and $\lambda_j$. As shown, the diagonal of the matrix exhibits bright spots demonstrating the high degree of correlation of an intensity pattern with itself, whereas out of diagonal terms are almost perfectly zero, illustrating the absence of correlation between patterns obtained at different wavelengths.

Figure 6:
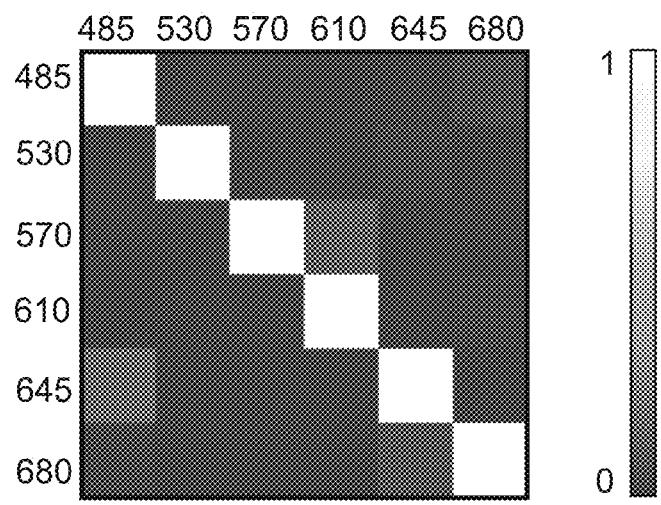
FIG. 6 is a schematic illustration of optical mask properties according to the invention.

The degree of correlation between spectral channels may also be represented in a "correlation matrix" as illustrated in FIG. 6. The amplitude of the coefficient at position (j, k) in the matrix represents the amplitude of the maximum signal in the image located at position (j,k) in FIG. 5. Characterizing the correlation matrix enables to reveal the number of independent spectral channels, 6 in this example. As shown, this matrix is almost diagonal, which demonstrates the feasibility of efficiently uncoupling the contribution of every individual spectral channel once a multi-spectral signal image is recorded.

The wavefront sensor 10 mentioned above may be used to determine the wavefront shapes of the multi-spectral signal light beam 22 from a single signal image acquisition of the said multi-spectral signal light beam.

Figure 7:
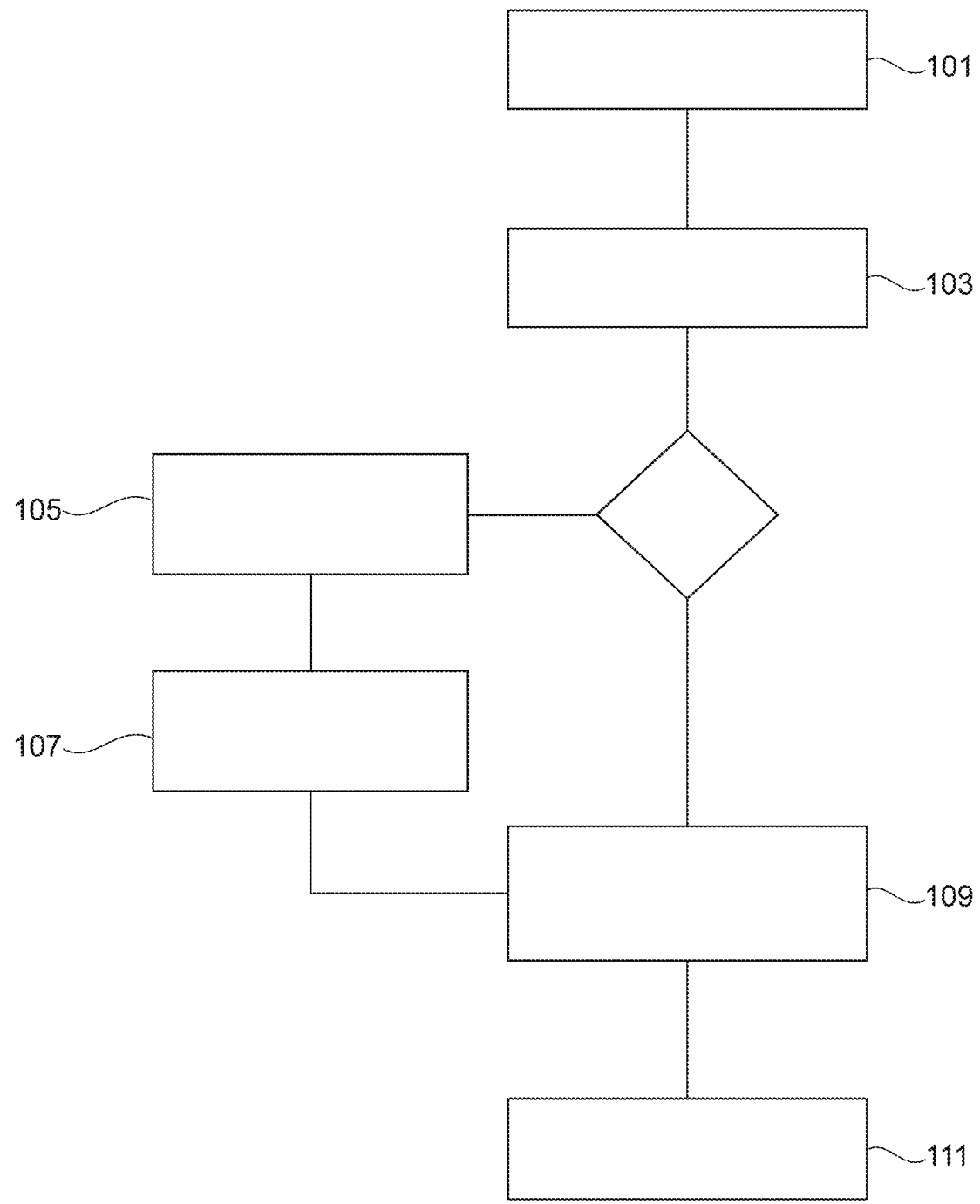
FIG. 7 is a schematic of one embodiment of a method according to the invention.

FIG. 7 illustrates a method according to the present invention.

First, at step 101, several reference intensity patterns $R_L(x,y)$ are recorded. Each reference intensity pattern $R_L(x,y)$ is generated by sending a respective reference incident monochromatic beam L with wavelengths $\lambda_L$ onto the wavefront sensor 10, L varying from 1 to N with N the number of different reference incident monochromatic beams, x and y are coordinates. Reference incident monochromatic beams may have a same known wavefront shape, for example a planar or a spherical wavefront.

Then, at step 103, a single signal image I(x,y) of an intensity pattern is recorded using the imaging sensor 18. The latter is generated by sending the said multi-spectral signal light beam 12 onto the optical mask 14. The light beam 12 comprises at least the N wavelengths $I_L$.

In a variant, reference intensity patterns $R_L(x,y)$ are recorded after recording the single signal image I(x,y) of the intensity pattern generated by the said multi-spectral signal light beam 12.

In order to determine the wavefront shape at the N wavelengths $\lambda_L$, deformation data $T_L^I(x,y)$ are computed at step 109 using computing means. Such data is representative of a diffeomorphism of each reference intensity pattern $R_L(x,y)$.

At step 109, intensity-weight data $W_L^I(x,y)$ is also computed. This data is representative of an intensity modulation of each reference intensity pattern at wavelength $\lambda_L$.

All the N intensity-weight data $W_L^I(x,y)$ and the N deformation data $T_L^I(x,y)$ being computed, for L varying from 1 to N, so as to minimize, for all sampling points (x,y) of the surface area A, from the single signal image I(x,y):

a difference $D_A$ between the single signal image I(x,y) on the one hand, and the sum of reference intensity patterns $R_L$ multiplied by intensity-weight data $W_L^I(x,y)$ and deformed by deformation data $T_L^I(x,y)$, on the other hand:

$$D_A = \left\| I(x,y) - \sum_L W_L^I(x,y) R_L\left[(x,y) + T_L^I(x,y)\right] \right\|_A$$

the symbol $\|\cdot\|_A$ designating a norm calculated for all (x,y) sampling points in the surface area A;

The quantity may comprise a regularization term.

Finally, at step 111 data are generated for each wavelength $\lambda_L$ representative of: the shape of the wavefront by integrating the deformation data $T_L^I(x,y)$ over at least one direction of the intensity pattern image, preferably over the two direction of the intensity pattern image; and the intensity map based on the intensity-weight data $W_L^I(x,y)$.

In some applications, for instance for complex distorted wavefronts, it is preferable to work at a local scale rather than to perform the estimation on the global intensity pattern. One possibility consists in splitting the intensity pattern into signal sub-images, each representative of light impinging on a portion A' and to estimate local deformation data $T_L^I(x,y)$ for each sub-image and for every wavelength $\lambda_L$.

In this case, the method may comprise two additional steps 105 and 107 preceding step 109. At step 105, the intensity pattern is split into several sub-images, each representative of light impinging on a portion A' of the at least one surface area A. At step 107, the intensity-weight data $W_L^I(x,y)$ and the deformation data $T_L^I(x,y)$ are calculated between the signal sub-image and each of the reference so as to minimize the differences $D_{A'}$ for all the surface areas; and at step 109, deformation data $T_L^I(x,y)$ are obtained by updating the value of $T_L^I(x,y)$ at at least one point (x,y) inside the said surface area A'.

The intensity-weight data $W_L^I(x,y)$ and the deformation data $T_L^I(x,y)$ may be estimated by computing zero-mean cross-correlation product images, for each signal sub-image, between the signal sub-image and each of the reference intensity patterns, the plurality of reference incident monochromatic beams L being uncorrelated relatively to the zero-mean cross-correlation product, the zero-mean cross-correlation product image between the signal sub-image and each of the reference intensity patterns $R_L(x,y)$ having a peak, the intensity-weight data being the amplitude of the peak and the deformation data $T_L^I(x,y)$ being the displacement vector between the said peak or its centroid from the center of the zero-mean cross-correlation product image.

In other embodiments, the intensity-weight data $W_L^I(x,y)$ and displacement data $T_L^I(x,y)$ are computed thanks to a Wiener deconvolution of the signal sub-images by the reference intensity patterns $R_L(x,y)$, or a Wiener deconvolution of the reference intensity patterns $R_L(x,y)$ by the signal sub-images.

The intensity-weight data $W_L^I(x,y)$ and displacement data $T_L^I(x,y)$ may be computed thanks to a matrix inversion algorithm, where the matrices to be inverted being related to at least a transform of a sub-image of a reference intensity pattern $R_L(x,y)$, such as a Fourier transform.

The intensity-weight data $W_L^I(x,y)$ and displacement data $T_L^I(x,y)$ may be computed thanks to an iterative optimization procedure, for example a mean-squared-difference minimization algorithm as a steepest descent optimization algorithm.

Intensity-weight data $W_L^I(x,y)$ and displacement data $T_L^I(x,y)$ may be computed thanks to a compressed sensing algorithm.

Other reconstruction algorithms may be used among which all techniques relying on matrix inversion, for example, Moore-Penrose pseudo-inversion, singular value decomposition, Tikhonov regularization.

The intensity-weight data $W_L^I(x,y)$ and displacement data $T_L^I(x,y)$ may be computed thanks to a stochastic optimization method, for example, a genetic algorithm or a Markov chains Monte-Carlo (MCMC) method.

Figure 8:
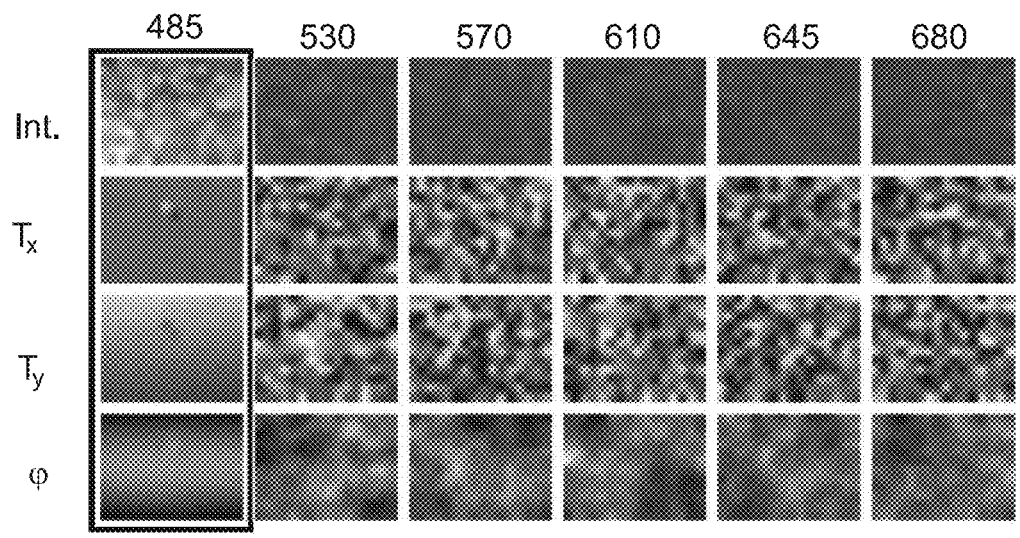
FIG. 8 shows an example of reconstruction of the shapes of wavefront using a method according to the invention.

FIG. 8 displays an example of a reconstruction of a single line beam at 485 nm illuminated the imaging sensor 18. In the example illustrated herein, the light beam is modulated by a cylindrical lens. The imaging sensor 18 is a matrix imaging sensor whose size is 1024×768 pixels.

The full signal intensity pattern is split in macro-pixels of size 64×64 pixels, so resulting in images of size 15×12 macro-pixels. For each macro-pixel the signal intensity pattern is Wiener deconvolved by each reference intensity pattern $R_L(x,y)$ at wavelengths 485 nm, 530 nm, 570 nm, 610 nm, 645 nm, and 680 nm.

The first line represents a map of intensity weight data $W_L^I(x,y)$. Lines 2 and 3 show displacement data $T_L^I(x,y)$ over horizontal and vertical direction, respectively. Line 4 display data representative of the wavefront shape. In this example, data displayed are representative of beam phases.

As can be seen, only in the first column, corresponding to the wavelength 485 nm, a significant signal can be detected, so demonstrating that no signal is present in the other spectral channels. Since the wavefront of the signal beam was modulated by a cylindrical lens, a cylindrical phase delay was measured in this spectral channel. Phase maps computed in other spectral channels look like noise since associated with no intensity signal.

Figure 9:
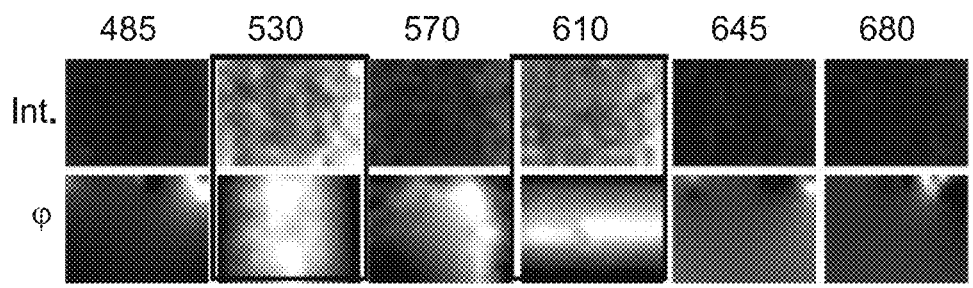
FIG. 9 shows an example of reconstruction of the shapes of wavefront using a method according to the invention.

FIG. 9 illustrates an example of performing simultaneous two-color spectro-wavefront measurements. In this case, a synthetic signal intensity pattern is obtained by summing the experimental signal intensity patterns obtained from two different wavelengths, namely at 530 and 610, each of signal intensity patterns being obtained with two different wavefront modulations. Wiener deconvolution macro-pixel per macro-pixels allows retrieving the wavefronts at both wavelengths from this single signal intensity pattern.

Like in FIG. 4, only spectral channels with significant enough intensity maps are to be considered.

Additional Example of Invention

In an embodiment, a method according to the present invention relies on the specific properties of random intensity patterns generated by diffusers or more generally by an optical mask having the optical properties:

i) to cause the intensity pattern to depend on the wavefront shape, so that a tilt applied to the wavefront shape results in a displacement amount of the intensity pattern, ii) to produce uncorrelated intensity patterns over at least one surface area A of the imaging sensor, for a plurality of respective incident monochromatic beams of different wavelengths having a same wavefront shape, The principle is described below.

If two beams exhibit the same wavefront and the same intensity distribution, and only differ in their wavelength, the intensity patterns on the camera will be different. The similarity degree between two intensity patterns $\{s_j\}_{j=1,2}$, obtained at two different wavelengths depends on the spectral difference $\delta\lambda = \lambda_1 - \lambda_2$.

The degree of similarity between two patterns can be mathematically characterized using several correlation tools. One solution to characterize two intensity patterns consists in localizing critical points of the intensity such as intensity maxima and to look for correlations between intensity maxima localization of two patterns. The localization correlation can be quantified using a Pearson correlation coefficient. It can also be quantified using the mean average distance to the nearest neighbor weighted by the critical point density. Such correlation characterization between two different populations of critical points in different field patterns was achieved in Gateau et al. ArXiv 1901:11497.

Alternatively, correlation between two intensity patterns is characterized by computing the zero-mean cross-correlation product. The statistical average of the cross-correlation product between two uncorrelated random signals (of zero mean) is zero.

For intensity patterns $\{R_L\}_{L=1,2}$:

$$\langle(R_1 - \langle R_1 \rangle) * (R_2 - \langle R_2 \rangle)\rangle = 0$$

Where $\langle \cdot \rangle$ stands for a statistical average. This statistical average may be achieved by integrating the intensity pattern over a given surface area of the imaging sensor under ergodic hypothesis.

Conversely, the zero-mean cross-correlation product of a signal intensity pattern with itself, also called auto-correlation function, is a peaked function:

$$C(R_1, R_2) = (R_1 - \langle R_1 \rangle) * (R_1 - \langle R_1 \rangle) = \delta(r)$$

Where $\delta$ designates the Dirac distribution, for example if $s_1$ is assumed to be of variance 1, and r is a spatial coordinate on the imaging sensor.

An optical mask may be designed so that to satisfy orthogonality properties between patterns obtained at different wavelengths.

Alternatively, a diffuser generating wavelength-dependent random intensity patterns, speckles.

Mathematically, two uncorrelated random intensity patterns (or speckles) are thus statistically orthogonal relatively to the zero-mean cross-correlation product.

In cases where the intensity pattern is a speckle, the integration surface area should at least contain one "speckle grain" and the larger the integration surface area, the better the validity of the orthogonality approximation. The zero-mean cross-correlation product thus provides a useful inner product.

Noteworthy, the orthogonality property satisfied by speckles generated by a diffuser is in particular true in a statistical sense, or in other words, when averaged over a large amount of speckle grains. For a given number of speckle grains, a small spectral difference 8R will not result in any significant change in the intensity pattern. The larger the number of speckle grains, the higher the spectral sensitivity.

In some embodiments, optical masks with tailored properties may be designed to optimize the orthogonality of patterns obtained at different wavelengths. In this case, regular diffuser would be replaced by specifically engineered diffractive optical elements or pseudo-diffusers. Optimizing the orthogonality of patterns not only reduces the cross-talk between spectral channels but also provides a simple mean to retrieve the wavefronts at each spectral channel thanks to the simple zero-mean cross-correlation product or a Wiener deconvolution.

Mathematical Grounding, Theoretical Principle

Given a polychromatic signal beam composed of a discrete spectrum $\{\lambda_1, \ldots, \lambda_n\}$.

If illuminating the diffuser with such a polychromatic light beam, every individual wavelength will produce its own proper signal intensity pattern. The total signal intensity pattern of the polychromatic beam is then the sum of all the individual signal intensity patterns.

In a calibration step, the reference intensity patterns $s_j(\vec{r})$ are obtained at each individual wavelength $\lambda_j$, where $\vec{r}$ is the spatial coordinate vector on the imaging sensor.

In an embodiment, the wavefront changes are, in particular, beam-tilts, hence resulting in global shifts of the monochromatic signal intensity patterns at the imaging sensor. The total single signal intensity pattern at the imaging sensor 18 will then be:

$$I(\vec{r}) = \sum_{j=1}^{n} \alpha_j R_j(\vec{r} - \vec{r}_j) \tag{1}$$

where $\alpha_j$ is the weight of the contribution to the signal beam at wavelength $\lambda_j$ and $\vec{r}_j$ a translation vector resulting from the beam-tilt.

Mathematical treatments allow to retrieve every individual $\alpha_j$ and $\vec{r}_j$.

To achieve so, the zero-mean cross-correlation product on $R_n$ may be performed:

$$\langle(I - \langle I \rangle) * (R_n - \langle R_n \rangle)\rangle = \sum_{j=1}^{n} \alpha_j \langle(R_j(\vec{r} - \vec{r}_j) - \langle R_j \rangle) * (R_n - \langle R_n \rangle)\rangle$$

$$\langle(I - \langle I \rangle) * (R_n - \langle R_n \rangle)\rangle = \alpha_n \delta(\vec{r} - \vec{r_n})$$

Where $\langle \cdot \rangle$ stands for a statistical average. The result of this mathematical treatments may be a translation image exhibiting a peaked function of amplitude $\alpha_j$, whose peak is centered at $\vec{r}_j$. The parameter $\vec{r}^j$ gives access to the uniform deformation data $T_L(x,y) = -\vec{r}_j$ while $\alpha_j$ gives access to the uniform intensity weight data $W_L(x,y) = \alpha_j$ of the beam at wavelength $\lambda_j$.

In the following, several possible algorithmic implementations are cited for retrieving these parameters. However, whatever the algorithm used, the orthogonality of the wavelength-dependent reference intensity patterns relatively to the zero-mean cross-correlation product is the common theoretical grounding requirement.

Practical Algorithmic Implementation

In some embodiments, typical wavefront distortions are more complex than simple tilts. Integration of the displacement vector maps will then provide the wavefronts, as described above.

Algorithms such as Demon Algorithm may be used in order to compute direcTLIy a distortion map (Berto, P., Rigneault, H., & Guillon, M. (2017), Wavefront sensing with a thin diffuser. Optics letters, 42(24), 5117-5120). Deep-learning computational approaches based on neuronal networks can also be implemented in order to find the distortion maps. A more simple approach consists in splitting the original intensity map into macro-pixels. At a "local scale", the signal intensity pattern is just translated and pattern deformation may be neglected, making algorithms more simple. The "local" translation of the signal intensity pattern is proportional to the "local tilt" of the wavefront.

One algorithmic difficulty consists defining what the size of the "local scale" is, what should the size of the macro-pixel be. In practice, it depends on geometrical and physical parameters of the WFS. This point is thus discussed now.

As a first simple algorithmic implementation, the zero-mean cross-correlation product, extensively discussed above, may be used. At the defined "local scale", the signal intensity pattern is just a translation of the reference intensity pattern. A crop in the pixilated full field camera image of the signal intensity pattern must thus be performed. The crop size now defines a macro-pixel (composed of several camera pixels), which will correspond, in the end, to the phase pixel; i.e. the pixel of the final phase image. Although the simplest solution consists in considering a square macro-pixel of constant size, the macro-pixel size may vary depending on the camera region. The size of the macro-pixel is a balance between the spatial resolution of the final phase image (the larger the macro-pixel, the fewer they are) and the spectral resolution of the WFS (the larger the macro-pixel, the larger the number of speckle grains per macro-pixel and the larger the number of orthogonal spectral modes over a given spectral width).

Once the signal intensity pattern is split into macro-pixels, every macro-pixel can be projected on the corresponding macro-pixels of the reference intensity pattern, thanks to the zero-mean cross-correlation product, as described above.

Alternatively, a Wiener deconvolution can be used rather than a zero-mean cross-correlation product. Wiener deconvolution is very similar to a zero-mean cross-correlation product. This similarity appears when performing these operations in the Fourier domain.

Considering a signal image I and a reference image R, their two-dimensional Fourier transform are then written Î and R̂. The Fourier transform of their cross-correlation is then F=*R̂*Î where $\vec{R}$* is the complex conjugate of R. By comparison, the Fourier transform of the Wiener deconvolution of S by R is:

$$W = \frac{R^*I}{\sigma^2 + R^2}.$$

Here the term $\sigma^2$ is an average signal to noise ratio. Note that both the cross-correlation product and Wiener deconvolution are slightly dissymmetric in R and I. For our data treatment exchanging the role of R and I does not change significantly the result. Our preliminary data presented below are obtained using Wiener deconvolution.

In practice, intensity patterns obtained at different wavelengths are only orthogonal in a statistical sense. Consequently, there may be some cross-talk between spectral channels. To reduce these cross-talk Iterative Wiener deconvolution can be implemented to suppress the cross talk effect. In this implementation, an estimate of $\alpha_j$ and $\vec{r}_j$ are first deduced from the translation image obtained thanks to a Wiener deconvolution. Second, assuming the expected signal intensity pattern is numerically rebuilt according to equation (1). As a third step, the expected signal intensity pattern is compared to the actual experimental signal intensity pattern and differences are sent as an input for step 1. Steps 1 to 3 can then be iterated.

A more elaborated compressed sensing algorithms can also be used, taking into account that a given wavelength can only be responsible for a single peak. Such algorithms are optimized to simultaneously minimize two quantities, one of which being the root mean squared error between the experimental data (the signal intensity beam) and the rebuilt data. The other quantity to be minimized here is the number of non-zero coefficients in each translation image.

More elaborated reconstruction algorithms may be used among which all techniques relying on matrix inversion: Moore-Penrose pseudo-inversion, singular value decomposition (also called principal component analysis), Tikhonov regularization etc. For instance, principal component analysis was used in N. K. Metzger et al., Nat Commun 8:15610 (2017) to make a very sensitive spectrometer. Such a matrix pseudo-inversion can be achieved the following way. In the Fourier domain, equation (1) can be written:

$$F(I)(\vec{k}) = \sum_{j=1}^{n} \alpha_j R_j(\vec{k})e^{-i\vec{k}\cdot\vec{r}_j}$$

Where $R_n(\vec{k})$ are the 2D Fourier transforms of reference intensity patterns, we then have:

$$R_n^*(\vec{k})F(I)(\vec{k}) = \sum_{j=1}^{n} \alpha_j R_n^*(\vec{k})R_j(\vec{k})e^{-i\vec{k}\cdot\vec{r}_j}$$

Which can be simply re-written as a matrix equation to invert:

$$V_I(\vec{k}) = M(\vec{k})V_O(\vec{k})$$

Where $V_I = R_n^*F(I)$, $M_{n,j} = R_n^*R_j$ and $V_O(\vec{k}) = \alpha_j e^{-i\vec{k}\cdot\vec{r}_j}$.

The present invention is not limited to these embodiments, and various variations and modifications may be made without departing from its scope.

The invention claimed is:

1. A method for determining wavefront shapes of N spectral channels of a multispectral light beam from a single signal image I(x,y) acquisition of said multispectral signal light beam,
the method using a device comprising an optical assembly made at least of an optical mask and an imaging sensor for generating and recording intensity patterns of incident beams by having the incident beams reflect on, or propagate through, the optical mask,
wherein the optical mask is configured with optical properties:
i) to cause the intensity patterns to depend on each of the wavefront shapes, so that a tilt applied to each of the wavefront shapes results in a displacement amount of the intensity patterns,
ii) to produce uncorrelated intensity patterns over at least one surface area (A) of the imaging sensor for a plurality of respective incident monochromatic beams of different wavelengths each having a same wavefront shape,
wherein two uncorrelated random intensity patterns are defined as statistically orthogonal relatively to a zero-mean cross-correlation product,
the method comprising:
a) recording reference intensity patterns $R_L(x, y)$ using the device, each of the reference intensity patterns $R_L(x, y)$ being generated by a respective reference incident monochromatic beam L with wavelengths $\lambda_L$, L varying from 1 to N, with N being a number of different reference incident monochromatic beams, x and y being coordinates;

b) recording one single signal image I(x, y) of the intensity patterns generated by said multispectral signal light beam which comprises at least the N wavelengths, using the device, the single signal image I(x, y) being representative of light impinging on the at least one surface area (A);

c) computing intensity-weight data $W_L{}'(x, y)$ and deformation data $T_L{}'(x, y)$, for all L varying from 1 to N, the intensity-weight data $W_L{}'(x, y)$ and the deformation data $T_L{}'(x, y)$ being representative of an intensity modulation and a diffeomorphism, respectively, of each of the reference intensity patterns $R_L(x, y)$, at wavelength $\lambda_L$, for the single signal image I(x, y), all N intensity-weight data $W_L{}'(x, y)$ and N deformation data $T_L{}'(x, y)$ being computed, for L varying from 1 to N, so as to minimize, for all sampling points (x, y) of the at least one surface area (A), from the single signal image I(x, y):

a difference $D_A$ between the single signal image I(x, y), and sum of the reference intensity patterns $R_L(x, y)$ multiplied by the intensity-weight data $W_L{}'(x, y)$ and deformed by the deformation data $T_L{}'(x, y)$ is represented by:

$$D_A = \left\| I(x, y) - \sum_{L=1}^{N} W_L^I(x, y) R_L[(x, y) + T_L^I(x, y)] \right\|_A$$

where symbol $\|\cdot\|_A$ designates a norm calculated for all (x, y) sampling points in the at least one surface area (A);

wherein for the at least one surface area (A), each of the reference intensity patterns $R_L(x, y)$ are orthogonal to each reference intensity patterns $R_K(x, y)$ relatively to the zero-mean cross-correlation product, when K represents a different incident monochromatic beam other than L and chosen between [1; N]; and d) generating data for each of the wavelengths $\lambda_L$ representative of:

each of the wavefront shapes by integrating the deformation data $T_L{}'(x, y)$, and an intensity map based on the intensity-weight data $W_L{}'(x, y)$.

2. The method according to claim 1, wherein the imaging sensor is a matrix imaging sensor, and in the step c), the at least one surface area (A) is $A=\Sigma A_i$, with $A_i$ being a macropixel of surface area, and includes:

computing intensity-weight data $W_L{}'(A_i)$ and deformation data $T_L{}'(A_i)$ which are constant for the macropixel of surface area $(A_i)$, for all L varying from 1 to N, by minimizing a difference $D_{Ai}$, and updating the intensity-weight data $W_L{}'(x, y)$ and the deformation data $T_L{}'(x, y)$ for all coordinates (x, y) on the at least one surface area (A), wherein the intensity-weight data $W_L{}'(x, y)=W_L{}'(A_i)$ and the deformation data $T_L{}'(x, y)=T_L{}'(A_i)$ for all (x, y) belonging to the macropixel of surface area $(A_i)$.

3. The method according to claim 2, wherein the method further comprises evaluating a correlation for a signal sub-image extracted from each of the reference intensity patterns $R_L(x, y)$, wherein the signal sub-image is a macro-pixel whose size is larger or equal to N pixels of the matrix imaging sensor.

4. The method according to claim 2, wherein an estimate of the deformation data $T_L{}'(A_i)$ and the intensity-weight data $W_L{}'(A_i)$ and of a minimum of the difference $D_{Ai}$ is obtained by computing for each zero-mean cross-correlation product image of zero-mean cross-correlation product images, for each respective portion of the macropixel of surface area $(A_i)$, $D_{Ai}$ being defined relatively to a norm designated by symbol $\|\cdot\|_{Ai}$, between a signal sub-image I(x, y) and each of the reference intensity patterns $R_L(x, y)$ with respective (x, y) coordinates for each respective portion of the macropixel of surface area $(A_i)$, wherein the zero-mean cross-correlation product images between the signal sub-image I(x, y) and each of the reference intensity patterns $R_L(x, y)$ have a peak, wherein the intensity-weight data $W_L{}'(A_i)$ is the amplitude of the peak, and the deformation data $T_L{}'(A_i)$ is a displacement vector between said peak or its centroid from center of each respective zero-mean cross-correlation product image of the zero-mean cross-correlation product images.

5. The method according to claim 2, wherein an estimate of the deformation data $T_L{}'(A_i)$ and the intensity-weight data $W_L{}'(A_i)$ and of the difference $D_A$ is obtained by computing a Wiener deconvolution for each respective portion of the macropixel of surface area $(A_i)$, $D_{Ai}$ being defined relatively to a norm designated by symbol $\|\cdot\|_{Ai}$, the Wiener deconvolution relating to:

a Wiener deconvolution of signal sub-images by the reference intensity patterns $R_L(x,y)$, or a Wiener deconvolution of the reference intensity patterns $R_L(x,y)$ by the signal sub-images.

6. The method according to claim 2, wherein an estimate of the deformation data $T_L{}'(A_i)$ and the intensity-weight data $W_L{}'(A_i)$ and of the difference $D_{Ai}$ is obtained for each respective portion of the macropixel of surface area $(A_i)$, by computing a matrix inversion algorithm, $D_{Ai}$ being defined relatively to a norm designated by symbol $\|\cdot\|_{Ai}$, wherein matrices of the matrix inversion are inverted in relation to at least a transform of a sub-image of an instant intensity pattern $R_L(x, y)$ of the reference intensity patterns, and wherein the matrix inversion includes a Fourier transform.

7. The method according to claim 2, wherein an estimate of the difference $D_A$ is obtained by computing the intensity-weight data $W_L{}'(x, y)$ and the deformation data displacement data $T_L{}'(x, y)$ using an iterative optimization algorithm or using a compressed sensing algorithm.

8. The method according to claim 1, wherein the optical mask is an engineered pseudo-diffuser, said engineered pseudo-diffuser being configured to produce the reference intensity patterns $R_L(x, y)$ that are exactly orthogonal to each of the reference intensity patterns $R_K(x, y)$ relatively to the zero-mean cross-correlation product over the at least one surface area (A).

9. The method according to claim 8, where the at least one surface area (A) is in range from $$A = \frac{1}{10} N \left(\frac{\lambda}{\theta}\right)^2 \text{ to } A = 10 N \left(\frac{\lambda}{\theta}\right)^2,$$

$\theta$ being a scattering or diffracting angle of the optical mask (14), where N represents the number spectral channels and $\lambda$ a central wavelength, an average wavelength or a median wavelength of the multispectral signal light beam.

10. The method according to claim 1, wherein the optical mask is a diffuser or a diffractive optical element.

11. The method according to claim 1, wherein the optical mask is a dispersive optical fiber bundle, a metasurface, or a freeform optical element.

12. The method according to claim 1, wherein an estimate of deformation data $T_L'(A_i)$ and intensity-weight data $W_L'(A_i)$ and of a difference $D_{Ai}$ is computed using deep learning approaches incorporating neuronal networks which minimize the difference $D_{Ai}$ with a collection of signal images, references images with respective N wavefronts known, the difference $D_{Ai}$ being defined relatively to a norm designated by symbol $\|\cdot\|_{Ai}$.

13. The method according to claim 1, wherein the intensity-weight data $W_L'(X, y)$ and the deformation data $T_L'(X, y)$ are computed using a norm of the symbol $\|\cdot\|_A$, the computing including a genetic algorithm for testing and evaluating a collection of potential solutions for minimizing the difference $D_A$.

14. The method according to claim 1, wherein the multispectral signal light beam is generated by a broadband laser system, wherein the broadband laser system comprises a chirped pulse amplifier laser system.

15. The method according to claim 14, where a spectral phase of the multispectral signal light beam is known at least on a fraction of the at least one surface area (A) of the imaging sensor, the method comprising computing of the spectral phase for at least one surface fraction of an imaging surface other than the said fraction of the at least one surface area (A), wherein the computing of the spectral phase is performed on all of the at least one surface area (A), the method further comprising computation of a temporal profile of the multispectral signal light beam on the at least one surface area (A) of the imaging sensor via a transform in spectral/time domain, the transform including Fourier transform, based on spatial distribution of the spectral phase.

16. The method according to claim 1, where an interferometer is added before the optical assembly in order to discretize spectrum of the multispectral signal light beam, the spectrum of said multispectral signal light beam exhibiting a continuous spectrum.

17. The method according to claim 1, wherein measured wavefront shapes are characteristic of some chromatic aberrations introduced by an optical system.

18. A wavefront sensor for determining wavefront shapes of N spectral channels of a multispectral signal light beam from a single signal image I(x, y) acquisition of said multispectral signal light beam, comprising an optical assembly made at least of:
an optical mask and an imaging sensor for generating and recording intensity patterns of incident beams by having the incident beams reflect on, or propagate through, the optical mask,
wherein the optical mask is configured with optical properties:
i) to cause the intensity patterns to depend on each of the wavefront shapes, so that a tilt applied to each of the wavefront shapes results in a displacement amount of the said intensity patterns,
ii) to produce uncorrelated intensity patterns over at least one surface area (A) of the imaging sensor for a plurality of respective incident monochromatic beams of different wavelengths each having a same wavefront shape,
wherein two uncorrelated random intensity patterns are defined as statistically orthogonal relatively to a zero-mean cross-correlation product,
the imaging sensor being configured to record:
(a) reference intensity patterns $R_L(x, y)$, each reference intensity pattern of the reference intensity patterns $R_L(x, y)$ being generated by having a respective reference incident monochromatic beam L, with wavelengths $\lambda_L$, reflect on or propagate through the optical mask, L varies from 1 to N, with N being a number of different reference incident monochromatic beams, x and y being coordinates;
b) one single signal image I(x, y) of the intensity patterns generated by the multi-spectral signal light beam which comprises at least the N wavelengths $\lambda_L$ configured to reflect on or propagate through the optical mask, the one single signal image I(x, y) being representative of light impinging on the at least one surface area (A);
computing means for:
c) computing intensity-weight data $W_L'(X, y)$ and deformation data $T_L'(x, y)$, for all L varying from 1 to N, the intensity-weight data $W_L'(x, y)$ and the deformation data $T_L'(X, y)$ being representative of an intensity modulation and a diffeomorphism, respectively, of each of the reference intensity patterns $R_L(x, y)$, at wavelengths $\lambda_L$, for the one single signal image I(x, y),
all N intensity-weight data $W_L'(x, y)$ and N deformation data $T_L'(x, y)$ being computed, for L varying from 1 to N, so as to minimize, for all sampling points (x, y) of the at least one surface area (A), from the single signal image I(x, y):
a difference $D_A$ between the single signal image I(x, y), and sum of the reference intensity patterns $R_L(x, y)$ multiplied by the intensity-weight data $W_L'(x,y)$ and deformed by the deformation data $T_L'(x,y)$ is represented by:

$$D_A = \left\| I(x, y) - \sum_{L=1}^{N} W_L^I(x, y) R_L\left[(x, y) + T_L^I(x, y)\right] \right\|_A$$

where symbol $\|\cdot\|_A$ designates a norm calculated for all (x, y) sampling points in the at least one surface area (A);
wherein for the at least one surface area (A), each of the reference intensity patterns $R_L(x,y)$ are orthogonal to each reference intensity pattern $R_K(x, y)$ relatively to the zero-mean cross-correlation product,
when K represents a different incident monochromatic beam other than L and chosen between; and
d) generating data for each of the wavelengths $\lambda_L$ representative of:
each of the wavefront shapes by integrating the deformation data $T_L'(x,y)$,
an intensity map based on the intensity weight data $W_L'(x,y)$.

19. The wavefront sensor according to claim 18, wherein the imaging sensor is a matrix imaging sensor, wherein the computing means are further configured to:
in the step c), compute intensity-weight data $W_L'(A_i)$ and deformation data $T_L'(A_i)$ which are constant for a macropixel of surface are $(A_i)$, for all L varying from 1 to N, by minimizing a difference $D_{Ai}$, where the at least one surface area (A) is $A=\Sigma A_i$,
update the intensity-weight data $W_L'(x,y)$ and the deformation data $T_L'(x,y)$ for all coordinates (x,y) on the at least one surface area (A), wherein the intensity-weight data $W_L'(x,y)=W_L'(A_i)$ and the deformation data $T_L'(x,y)=T_L'(A_i)$ for all (x, y) belongs to the macropixel of surface area $(A_i)$.

20. The wavefront sensor according to claim 19, wherein the computing means are further configured to estimate a minimum $T_L^I(A_i)$ and a minimum $W_L^I(A_i)$, and a minimum of the difference $D_{Ai}$ which is obtained by computing for each zero-mean cross-correlation product image of zero-mean cross-correlation product images for each respective portion of the macropixel of surface ($A_i$), between a signal sub-image I(x,y) and each of the reference intensity patterns $R_L(x, y)$ with respective (x, y) coordinates fir each respective portion of the macropixel of surface area ($A_i$), wherein the zero-mean cross-correlation product images between the signal sub-image I(x, y) and each of the reference intensity patterns $R_L(x, y)$ having a peak, wherein the intensity-weight data $W_L^I(A_i)$ is the amplitude of the peak and the deformation data $T_L^I(A_i)$ is a displacement vector between said peak or its centroid from center of each respective zero-mean cross-correlation product image of the zero-mean cross-correlation product images.

21. The wavefront sensor according to claim 18, wherein said optical mask is an engineered pseudo-diffuser that is configured to produce the reference intensity patterns $R_L(x, y)$ that are exactly orthogonal to each of the reference intensity patterns $R_K(x,y)$ relatively to the zero-mean cross-correlation product over the at least one surface area (A).

22. The wavefront sensor according to claim 18, wherein the optical mask is a diffuser or a diffractive optical element.

23. The wavefront sensor according to claim 18, wherein the optical mask is a dispersive optical fiber bundle, a metasurface, or a freeform optical element.

24. The wavefront sensor according to claim 18, wherein the computing means are further configured to estimate the difference $D_A$ by computing the intensity-weight data $W_L^I(x, y)$ and the deformation data $T_L^I(x, y)$ with:

a Wiener deconvolution of signal sub-images by the reference intensity patterns $R_L(x, y)$, or a Wiener deconvolution of the reference intensity patterns $R_L(x, y)$ by the signal sub-images.

25. The wavefront sensor according to previous claim 18, wherein the computing means are further configured to estimate the difference $D_A$ by computing the intensity-weight data $W_L^I(x, y)$ and the deformation data $T_L^I(x, y)$ with a matrix inversion algorithm, where matrices of the matrix inversion algorithm are inverted in relation to at least a transform of a sub-image of an intensity pattern $R_L(x, y)$ of the reference intensity patterns, and wherein the matrix inversion includes a Fourier transform.

26. The wavefront sensor according to claim 18, wherein the computing means are configured to estimate the difference $D_A$ by computing the intensity-weight data $W_L^I(X, y)$ and the deformation data displacement data $T_L^I(x, y)$ with an iterative optimization algorithm or using a compressed sensing algorithm.

27. An optical device comprising:

a wavefront sensor according to claim 18;

a light emitting source for generating the multispectral signal light beam with specific wavelengths, wherein the light emitting source comprises a broadband laser system, wherein the broadband laser system comprises a chirped pulse amplifier laser system.

\* \* \* \* \*